(12) United States Patent
Enthaler et al.

(10) Patent No.: US 10,333,336 B2
(45) Date of Patent: Jun. 25, 2019

(54) METHOD FOR OPERATING A CHARGING DEVICE, CHARGING DEVICE AND MOTOR VEHICLE

(71) Applicant: AUDI AG, Ingolstadt (DE)

(72) Inventors: Achim Enthaler, Ingolstadt (DE); Michael Mürken, Ingolstadt (DE); Andreas Thanheiser, Eichstätt (DE); Johann Krammer, Kühbach (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/827,149

(22) Filed: Nov. 30, 2017

(65) Prior Publication Data
US 2018/0159360 A1  Jun. 7, 2018

(30) Foreign Application Priority Data
Dec. 6, 2016 (DE) .................. 10 2016 224 295

(51) Int. Cl.
*H02J 7/04* (2006.01)
*H02M 7/217* (2006.01)
*H02J 3/26* (2006.01)
*H02J 7/02* (2016.01)
*B60L 53/14* (2019.01)
*B60L 58/12* (2019.01)

(52) U.S. Cl.
CPC .............. *H02J 7/045* (2013.01); *B60L 53/14* (2019.02); *B60L 58/12* (2019.02); *H02J 3/26* (2013.01); *H02J 7/02* (2013.01); *H02M 7/217* (2013.01); *B60L 2240/526* (2013.01); *B60L 2240/547* (2013.01); *Y02E 40/50* (2013.01)

(58) Field of Classification Search
CPC .............................. H02J 7/045; H02M 7/217
USPC .................. 320/104, 128, 134, 142
See application file for complete search history.

(56) References Cited

U.S. PATENT DOCUMENTS

2016/0268917 A1\* 9/2016 Ramsay ............... H02M 5/458

FOREIGN PATENT DOCUMENTS

| DE | 10 2010 014 146 A1 | 10/2011 |
|---|---|---|
| DE | 10 2011 078 047 A1 | 12/2012 |
| DE | 10 2013 204 256 A1 | 9/2014 |

(Continued)

OTHER PUBLICATIONS

German Search Report dated Aug. 3, 2017 of corresponding German application No. 102016224295.4; 8 pgs.

*Primary Examiner* — Edward Tso
*Assistant Examiner* — Aaron Piggush
(74) *Attorney, Agent, or Firm* — Maier & Maier, PLLC

(57) ABSTRACT

A method for operating a charging device for a battery of a motor vehicle. The charging device converts electric power obtained from a motor vehicle-external, three-phase energy system supplying other consumers in an infrastructure unit, in particular a house, by a converter device into an electric current that is suitable for charging the battery, and supplies electric energy of the battery by the converter device into the energy system. The charging device receives in an operating phase phase-resolved power data, which is fed to the energy system and measured by a measuring device, and determines phase-specified target power while using phase-related power data outputs for each phase. The target power that is determined for each phase is retrieved from each phase.

7 Claims, 2 Drawing Sheets

(56) References Cited

FOREIGN PATENT DOCUMENTS

EP 2 875 985 A1 5/2015
WO 2012/128626 A2 9/2012

\* cited by examiner

METHOD FOR OPERATING A CHARGING DEVICE, CHARGING DEVICE AND MOTOR VEHICLE

FIELD

The invention relates to a method for operating a charging device for a battery of a motor vehicle, wherein electric power is supplied to the charging device from a three-phase electric energy system of an infrastructure unit, which is supplying other consumers and which is external to the motor vehicle, in particular a house, by means of which a converter device converts electric current into an electric current that is suitable for charging a battery, and/or the electric energy of the battery is supplied by means of a converter device to the energy system. In addition, the invention relates to a charging device and to a motor vehicle.

BACKGROUND

Motor vehicles provided with chargeable electric batteries, which are in particular associated with the operation of an electric engine, have been already proposed in prior art. For example, purely electric engine vehicles are known, in which the electric engine is the only driving apparatus, as well as hybrid motor vehicles, which are equipped in addition to the electric engine also with another driving apparatus, in particular with an internal combustion engine. With the so-called plug-in hybrids as well as with electric engine vehicles, it is already known that the motor vehicle can be provided with a charging connection for connecting to a motor vehicle-external charging device, or for connecting directly to a motor vehicle-external energy system, such as for example a local network of a house, so that the battery can be charged by means of external energy sources.

Since motor vehicles are usually employed also for private use, it is desirable when the charging operation can be realized in as simple manner as possible in private use, so that the charging operations can be carried out also with a private infrastructure unit which supplies also other consumers.

Therefore, it was proposed already in prior art to provide charging devices that can be connected with a three-phase connection to the energy system of a local electric grid, and that can be provided with suitable power electronics components in order to convert the three-phase input alternating current to a current that can be used for charging a battery (direct current). Such three-phase charging devices charge the energy system evenly on all phases. Three-phase household connections or general infrastructure connection units are provided with at least one fuse for each phase, which can be impacted when it is overloaded, which is something that should be prevented by the charging device.

Various variants have already been proposed for the realization of the charging devices. So for example, charging devices that are fully integrated in the motor vehicle (On Board Chargers—OBC) are known, which are connected to the energy system with a three-phase connection via the charging connection of the motor vehicle, for example by using a motor vehicle-external wall box which can be provided with a suitable plug for the charging connection. It has also been already proposed to provide charging devices that are arranged completely outside of the motor vehicle, which are thus in particular associated with charging devices such as charging apparatuses for a particular infrastructure unit, for example direct current fast chargers, which provide a charging current that can be used directly via a charging connection of the motor vehicle for charging a battery. Moreover, other forms are also known, wherein some parts of the charging device are realized inside the motor vehicle, and some parts are realized outside the motor vehicle.

DE 10 2013 204 256 A1 relates to a charging device for an electric motor vehicle comprising a charging interface outside of the motor vehicle, to which an alternating current can be supplied at the input via a three-phase alternating current obtained from an external three-phase AC power grid, which can be supplied via a charging cable to the electric vehicle in order to charge the electric energy storage device of the motor vehicle. In this case it is proposed that the interface comprise a converter device for converting the three-phase alternating current to a one-phase alternating current for a charging current, which distributes during the operation the phase load to the line phase of a single-phase alternating current essentially in a uniform manner over the three line phases of the three-phase alternating current. In this manner, one-phase charging of electric motor vehicles can be achieved at the same time with a symmetrical load that is applied to the supply lines.

However, a problem with these and similar known charging devices is that other consumers in the infrastructure connected to different phases create an unsymmetrical load of the three-phase infrastructure unit connection. The charging device charges all of these phases, and the result may be that the line protection response causing a fuse failure may be triggered at the phase which has the highest load. If it were in this case provided that the protection of the charging device is compatible with the infrastructure unit connection and that its power is regulated and reduced in a timely manner over the three phases, the triggering of the fuse would be prevented. However, it would not be possible to exploit meaningfully the available power potential, in particular when the load on one of the phases is clearly much higher.

SUMMARY

The objective of the invention is therefore to define all alternatives that can make it possible to provide faster and/or improved charging and possibly also discharging of a three-phase charging device.

In order to achieve this objective with the method of the type mentioned in the introduction, the charging device receives in an operating phase of a measuring device electric power supplied from the energy system together with phase-resolved power data for each, while phase-related target power outputs are determined for each phase so that a target power output is retrieved from the phase for each phase.

According to the invention, it is therefore proposed to realize an asymmetric power requirement for the phases by means of the charging device, which thus allows a selective regulation of the individual phase of a multiphase charging device. In order to measure the power in the phases, a measuring device that is external to a motor vehicle is used in this case, which measures the supplied power in the local network of the infrastructure unit, which is received in the energy system that is external to the motor vehicle. Such a measuring device can be a conventional electricity meter, in particular a so called smart meter. Smart meters are already have their own intelligence, and they are also often provided with a communication device on the side of the measuring device, by means of which the current power data can be accessed, in particular by the charging device. An unbalanced load of the energy structure connection, in particular of a house connection, can thus be detected and counteracted in this manner. If for example the load is lighter on one phase while a heavy load is applied to another phase, more power may be requested from the phase with a light load and less power may be requested from the phase to which a heavy load is applied, so that an unused reserve can be realized proportionally to a uniform demand from the charging device over all of the phases.

By using the measuring device, which is usually in any case provided in the infrastructure unit, the power phase which is currently being supplied by an energy supplier to the infrastructure unit, and in particular delivered to a house, is measured. This information is transmitted continuously as power data via a communication interface to the charging device. The charging device is configured in such a way that it can set the power to be withdrawn from the energy system individually for all phases. The power consumption from the phases of the energy system that are already impacted by a heavy load can be thus reduced in this manner, and it can be increased for phases that are subjected to a lower load in order to make it possible to increase the total power available for charging the charging device by means of faster and effective charging.

The measuring device, which determines at a central location, in communication with the charging device, the phase-related electric load of the local network of the infrastructure unit, and the control device of the charging device, which realizes the method according to the invention, form a closed loop control, which in particular makes it possible to maximize the power withdrawn by the charging device and/or to create a symmetrical load of the individual phases in the energy system. In this case, it is preferred when the updating and application of real values is performed in real time. By being in constant communication with the measuring device at the connection of the infrastructure unit, in particular a house connection, it is possible to provide a quick reaction to external disturbances, which may be due for example to the household user's behavior, and the power outputs can thus be changed so quickly that mechanical fuses never need to be activated, so that a maximum charging device output can be achieved with optimum utilization of the energy system.

The possible applications for such charging device thus increase the charging speed of the battery, while the user does not necessarily need to increase the input power that is basically provided for his energy system, in particular at a house connection. On the contrary, the motor vehicle can be always charged while taking into account other users in the infrastructure unit, and always with the maximum power that is currently available as power for the charging device, without triggering the fuses.

It should be noted in this context that charging devices are also known which themselves can feed via the actual battery electric power into the electric system, so that a discharging operation is thus also enabled. The present invention therefore can be also used for this discharging operation, so that for example a higher charging output can be fed in as target output into phases that are subjected to a heavy load than in phases with a lighter load and the like. In general, an operating phase can thus include a charging operation as well as a discharging operation, wherein the invention is preferably employed for the charging operation.

It is expedient when the output data can include also the currently effective power per phase. The currently effective power is the amount that is detected and communicated by commercially available measuring devices, in particular electricity meters. In this case, it is not harmful, for example when maximizing the target power to be withdrawn for a phase, when only the effective power for that phase is know, because the idle power for conventional infrastructure units, in particular houses, can be usually estimated and/or even limited. Therefore, the control regarding the withdrawal of the power for an individual phase in can be carried out in a manner that does not trigger a fuse.

However, it is preferred when the power data also comprises idle power that is measured by means of the measuring device per phase, because the entire apparent power is then known and it can thus be immediately determined which current flow that is relevant to the triggering of a fuse is limited by the fuse, or which one is still additionally usable. Since the measuring device is able to determine the effective power, it is in any case assumed that the phase shift between the current and the voltage can be measured and that an idle power can thus be in principle also determined, which is already offered by many currently available measuring devices.

According to a particularly advantageous embodiment of the invention, it is provided in this context that the idle power measured per phase is received with the power data, wherein the idle power describing the power data is used to provide idle power compensation per phase for the entire energy system by means of compensation components deployed on the side of the charging device, in particular on the side of a power factor correction unit (PFC). Known multiphase charging devices are usually already provided with a power factor correction unit, which is used per phase as a compensation component (and often also with a power factor correction filter), and which can be referred to in English as a PFC unit (PFC—Power Factor Correction). These compensation components already make it possible to set the power factor, which is to say when capacitive and/or inductive idle power is present, for example in order to the set the range from 0.9 inductively to 0.9 to capacitively, or around 1. If the information about the idle power distribution over the individual phases is known, phase-differentiated components can be realized with the charging device, in particular with a control device.

As was already suggested, within the context of the present invention it is preferred when the target power outputs are determined in order to create a symmetrical load and to maximize the overall load of the individual phase that can be used for the charging operation and/or for the discharging operation, in particular to maximize the load so as to avoid triggering of a fuse. The charging and discharging output can thus be maximized in this manner, while a symmetrical load of the energy system can be also created at the same time. The triggering of fuses in a phase is avoided, while the maximum available charging device power is used over all phases.

It can be advantageous when the charging device is provided with associated power electronics for each phase, so that the target power can be adjusted by controlling the respective electronic component. In this manner, each of the phases ultimately has its own partially-charging device, and the resulting partially formed currents can then be combined to form a total charging current. A very elegant realization of the phase-selective controllability and of the control can thus be achieved in this manner.

The present invention also makes it in particular possible to use more powerful charging devices, in particular devices with a maximum charging device power of more than 10 kW, for example 11 kW or 22 kW, without the resulting risk that fuses will be triggered in this manner In particular, direct current fast chargers can be also used, in which a rectifier is not provided inside the motor vehicle for generating a charging direct current for the battery, but instead it is already included in a charger that is external to the vehicle, so that the charging direct current is in this case supplied via the charging device of the motor vehicle to the battery.

The present invention can be employed both for charging devices that are external to a motor vehicle, as well as with motor vehicle-internal charging devices and with mixed forms of such devices. In other words, it can be provided that a charging device is realized at least partially inside the motor vehicle and/or at least partially outside of the motor vehicle.

In addition to the method, the invention relates also to the a charging device for a battery of a motor vehicle, which is provided with a control device designed for carrying out the method according to the invention, which is equipped with a converter device and with a communication device for communicating with the measuring device. It is preferred when the charging device is provided with its own associated power electronics components for each phase, wherein the control device can actuate the individual power electronics components so as to realize the method. All embodiments relating to the method according to the invention may be analogously transferred to the charging device according to the invention, so that the already described advantages can be obtained as well.

Finally, the invention relates also to a motor vehicle, which is provided with a battery and with a charging device according to the invention for the battery to which the description above is also applicable. In this case, the charging device is therefore integrated in the motor vehicle (On Board Charger—OBC).

BRIEF DESCRIPTION OF THE FIGURES

Further advantages and details of the present invention will become apparent from the embodiments described below with reference to the drawings. The drawings show the following.

DETAILED DESCRIPTION OF THE FIGURES

Figure 1:
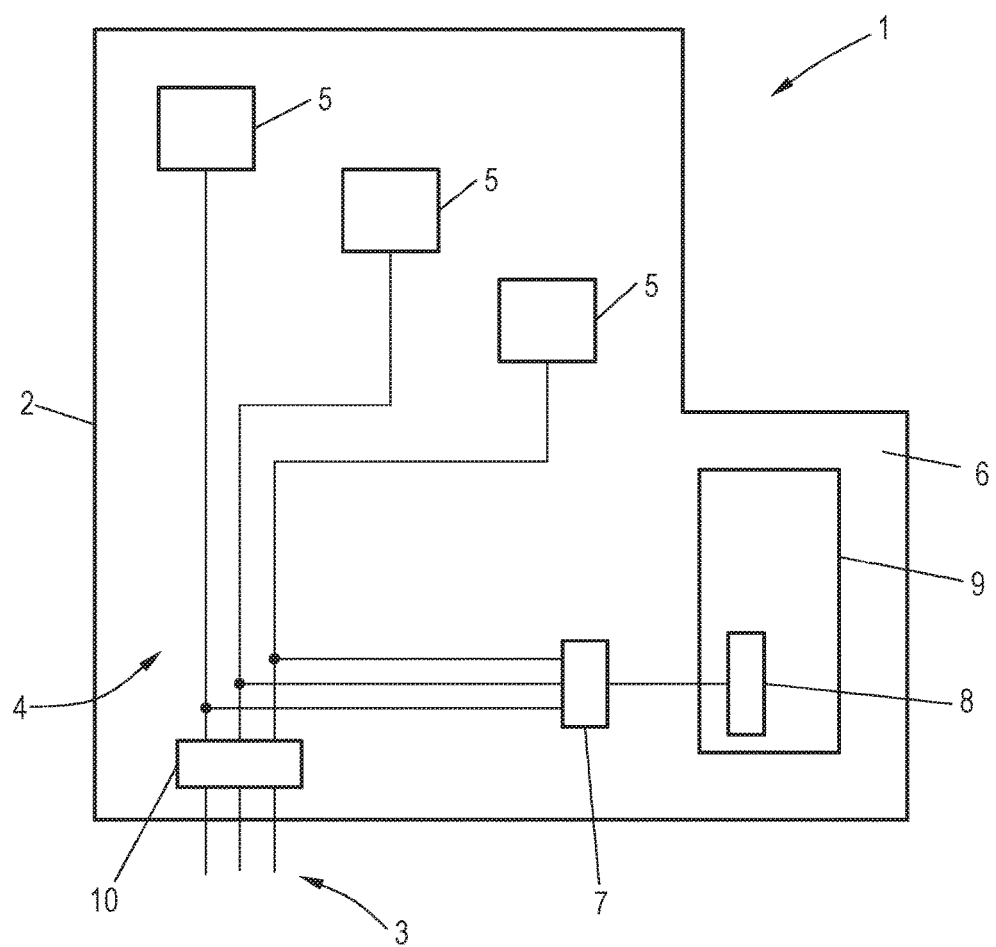
FIG. 1 a system for carrying out the method according to the invention.

FIG. 1 shows a schematic diagram showing an infrastructure unit 1, which is in the present case realized in a house 2. Three-phase power can be obtained via a house connection 3, namely from an energy supplier. The distribution of the incoming power is carried out in an energy system 4, in which parts of the resulting local network and potentially other connected subscribers are suggested only in principle.

A special consumer, who is or will be connected with a three-phase connection, is provided in the present case with a motor vehicle-external charging device 7, which is realized as a charging device in a garage 6 of a house 2 and which can be arranged for example in a charging column and/or in a wall box. A battery 8 of a motor vehicle 9 can be charged via a charging device t 7, wherein it is also possible to feed electric energy from the battery 8 via the charging device 7 into the energy system 4. The charging device 7 can be alternatively also built into the interior of the motor vehicle 9 and thus it can be then designed as an On Board Charger—OBC, while mixed forms are also conceivable. It is expedient when the motor vehicle-external charging device 7 of FIG. 1 is designed as a direct current fast charger.

Figure 2:
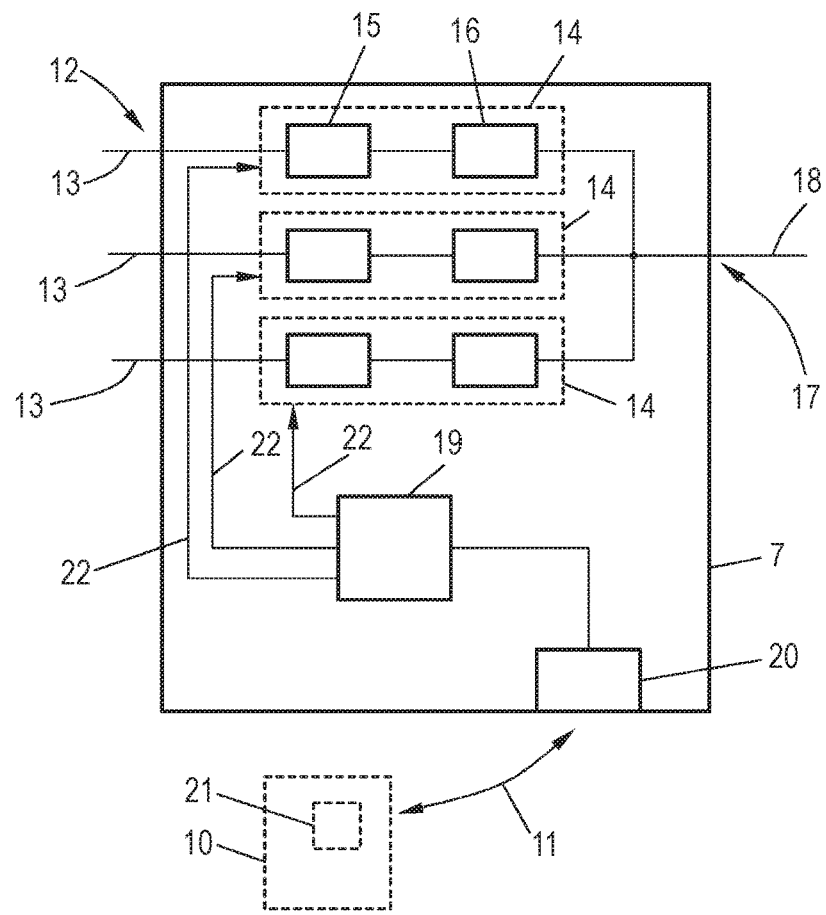
FIG. 2 a charging device according to the invention.

A measuring device 10, which is designed as a smart meter, measures the electric power that is introduced into the energy system 4 per phase, in particular both the effective power and the idle power. The current effective power and the current idle power per phase are made available via a communication connection 11 (see FIG. 2) to the charging device 7, which is illustrated with more detail with respect to its function in FIG. 2. The charging device 7 is provided with a three-phase input 12, to which can be connected lines 13 for each phase. Each phase is then conducted to a power electronics component 14, each of which comprises the respective power factor correction unit 15, shown here, and a converter device 16. A power factor can be set by means of a power factor correction unit 15 (PFC unit). The converter device 16 converts the alternating current of the respective phase into the charging current that is suitable for charging the battery 8. In this case, the converter device 16 includes in each case at least one converter so as to make it possible to generate the charging current as a direct current. The output of the respective converter devices 16 are then combined together in such a way that the charging current can be provided via an output 17 to a line 18, which can be for example a charging cable, to the battery 8.

The operation of the charging device 7, which is in present case designed for an output of more than 10 kW, for example 11 or 22 kW, is controlled by a control unit 19, which in the present case also has the function of a regulator. This is because the charging device 7 is further also provided with a communication device 20, by means of which the communication device connection 11 can produce a communication device 21 on the side of the measuring device.

The current effective power and the current idle power with power data obtainable per phase are received via the communication device 11. The control device 10 determines from this data the target power output for the individual phases in such a way that a maximum charging device power is realized simultaneously together with a symmetrical load of the phase by means of the energy system 4. Based on these target power outputs, the respective power electronics components are then actuated such that the target output determined for the phases is obtained from the energy system 4. This phase-differentiated activation, which can lead to a non-symmetrical load on the phases in the charging device controlled by the control device for producing a symmetrical load in the entire energy system 4, is illustrated by the arrows 22.

After the information about the phase-distributed idle power has been also provided, the control device 19 is further designed to activate the power electronics 14, which are in this case indicated specifically by the power factor correction units 15, in order to provide idle power compensation within the energy system 4. As constantly updated power data is provided, the control device 19 and the measuring device 10 in the end form a closed regulation circuit, wherein the target power output can be tracked and constantly updated so that changes of the load in the house 2, for example related to the user 5, can be reacted to quickly in order to realize maximum withdrawing of power from the charging device, without having to fear the risk that one of the fuses, not shown in detail in FIG. 1, will be triggered. The control device 19 thus checks in real time how much power can be withdrawn from one phase, without addressing the fuse, and then withdraws from the this phase the corresponding power, which leads to a maximization of the charging device power and at the same time also to symmetrization of the load on the phases in the entire system.

For this purpose, the characteristics of the fuses must be of course known to the control device 19.

Figure 3:
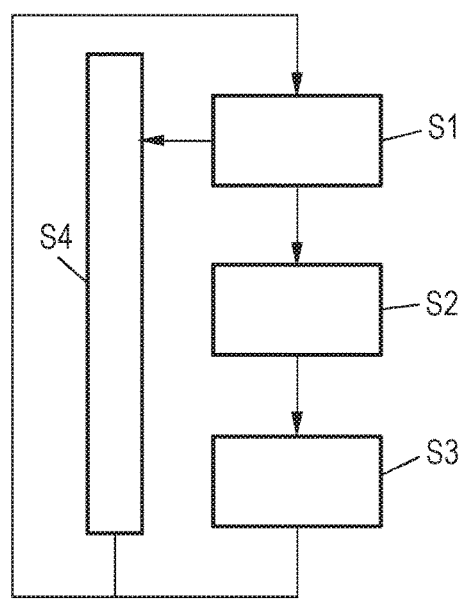
FIG. 3 a flowchart of the method according to the invention.

FIG. 3 summarizes one more time the method according to the invention in the form of a flowchart. In a step S1, the control device 19 receives the current power data from the measuring device 19. In a step S2, the power data are used in order to determine from it the currently desired power outputs which are to be tapped in the individual phases. In a step S3, these desired power outputs are converted with the corresponding actuation of the power electronics 14 for the respective phase. In parallel to all of these operations, the idle power compensation mentioned above is carried out in a step S4. Since the control device 19 always receives the most current data, constant tracking of the target power outputs is thus carried out in this manner.

A motor vehicle 6 according to the invention, not shown in more detail in the figures, is provided with a charging device 7 which is integrated in it as an On Board Charger (OBC). Such a motor vehicle-internal charging device 7 is in this case usually connected in a fixed manner to the battery 9 and to the charging connection, by means of which a direct connection is created for the three phases of the energy system 4.

The invention claimed is:

1. A method for operating a charging device for a battery of a motor vehicle, comprising:
    converting, by a converter device of the charging device, electric power obtained from a motor vehicle-external three-phase electric energy system supplying other users of an infrastructure unit to an electric current that is suitable for charging the battery and that supplies the electric energy of the battery by the converter device into the energy system,
    receiving, by the charging device, phase-resolved power data of an incoming electric power supplied into the energy system measured in an operating phase by a measuring device, and
    determining phase-related target power outputs for each phase while using the power data, wherein the target power determined for each phase is retrieved,
    wherein idle power is received with the power data by the measuring device, and
    wherein the idle power describing the power data is used in a phase-differentiated idle power compensation for the entire energy system by a compensation component on the side of the charging device.

2. The method according to claim 1, wherein the power data includes a currently effective power per phase.

3. The method according to claim 1, wherein the target power outputs are used to maximize the overall load of the individual phase and the charging device power which can be used for charging operations and for discharging operations.

4. The method according to claim 1, wherein the target power outputs are updated and applied in real time.

5. The method according to claim 1, wherein the charging device is provided with a power electronics component assigned to each phase, wherein the target power is set by activating the respective power electronics component.

6. The method according to claim 1, wherein a maximum charging device power of more than 10 kW and of a motor vehicle-external direct current fast charger device is used, which is designed as the charging device.

7. The method according to claim 1, wherein the charging device is used at least partially in the interior and at least partially outside of a motor vehicle.

* * * * *